Feb. 14, 1928.
H. M. CAMERON
SCALE
Filed Jan. 14, 1927
1,659,389
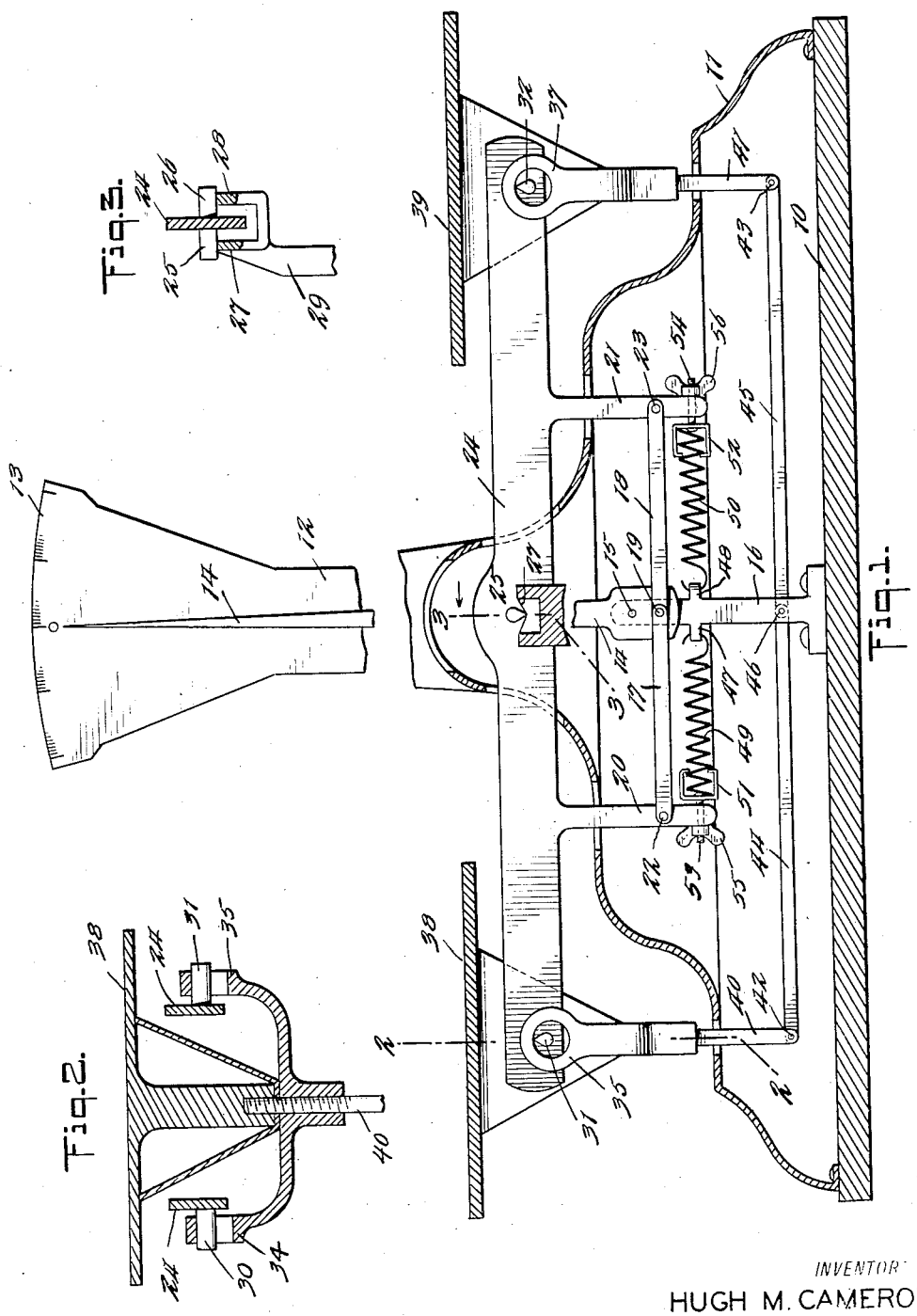
INVENTOR
HUGH M. CAMERON
BY
J. S. Wooster.
ATTORNEY Patented Feb. 14, 1928.

1,659,389

UNITED STATES PATENT OFFICE.

HUGH M. CAMERON, OF WOODHAVEN, NEW YORK, ASSIGNOR TO JOHN CHATILLON & SONS, OF NEW YORK, N. Y., A CORPORATION OF NEW YORK.

SCALE.

Application filed January 14, 1927. Serial No. 161,042.

This invention relates to scales of the over and under type.

An object of the invention is to provide a scale of simple compact construction of the above type which will accurately compensate for variations in weight a small amount over or under a predetermined value.

A further object is to provide a construction of scale in which errors in transmission of movement between the beam and the indicator are accurately balanced and thereby eliminated from the indication.

A still further object is to provide a construction in which the parts transmitting motion to the pointer are disposed compactly within the casing, preferably below the beam and in such manner that indications can be accurately recorded even though the scale may be disposed on a non-horizontal surface.

In its general aspect the invention comprises a double-pan, pivoted beam scale having a pointer and balanced, opposed, compensated connecting means between the beam and the pointer, preferably on both sides of the pivot point of the beam to transmit motion from the beam to the pointer. This means comprises connecting rods extending from the beam on opposite sides thereof to the pointer and having lines of action that are either coincident or parallel or both. In conjunction with the connecting means the movement of the beam in either direction from a normal position is opposed by means, preferably in the form of springs which are connected respectively to the beam on opposite sides of its pivot point and are adjustable and balanced oppositely to each other in their pull on the beam. These springs or resisting means are disposed with their axes preferably in alignment and along lines substantially parallel to the beam and the connecting rods. In this manner the movement of the connecting rods and the springs are along lines either coincident or parallel to each other eliminating the necessity, by reason of the balanced opposed relation of these parts, for designing the parts with such accuracy as to unduly increase the expense of the apparatus. This combination of elements for transmitting motion to the pointer and for providing a balanced resistance to the movement of the beam from a normal position is preferably disposed within the casing of the scale below the beam, consequently having a lower center of gravity which insures stability and compactness of arrangement which combined with the balanced features produces an extremely accurate operation.

The preferred form of the invention is illustrated in the drawings of which,

Fig. 1 is a vertical longitudinal section taken through the scale.

Fig. 2 is a transverse section taken on the line 2—2 of Fig. 1.

Fig. 3 is a transverse section taken on the line 3—3 of Fig. 1.

According to the drawing the scale is provided with a base 10 and a casing 11 which has an upright extension 12 at one side thereof carrying at its upper end a graduated scale portion 13. A pointer 14 is adapted to swing across the graduations and is pivoted at 15 on an upright 16 fastened to the base 10. Connecting rods 17 and 18 are pivotally fastened at 19 to the lower end of the pointer below the pivot point 15, these connecting rods at their other ends being pivotally fastened to pitmen 20 and 21 at points 22 and 23. These pitmen form part of and are dependent from a scale beam. This beam has knife edges 25 and 26 adapted to rest in grooves or notches 27 and 28 formed on the upper end of an upright 29 fastened to the base. The opposite ends of the scale beam are provided with knife edges 30, 31, 32 and 33. These knife edges are adapted to receive and support rings 34, 35, 36 and 37 forming parts of the frames of weight pans 38 and 39.

Dependent from the pan-frames are stems 40 and 41 which are pivotally connected at 42 and 43 to check rods 44 and 45. These rods at their other ends are pivotally connected at 48 to the pedestal 16.

The pedestal 16 is provided with lugs 47 and 48 to receive the inner ends of springs 49 and 50, the other ends of which are engaged by clips 51 and 52 connected to threaded stems 53 and 54 passing through the lower ends of the pitmen 20 and 21. These threaded stems are engaged by wing nuts 55 and 56, whereby the tension of the springs 49 and 50 can be adjusted.

It will be observed that the axes of the beam 24, the connecting rods 17 and 18, and the springs 49 and 50 are all substantially parallel. On each side of the pivot point of the beam 24 motion is transmitted from said beam to the pointer 14 by connecting rods which act along substantially the same line or axis and in opposition to each other so that any errors of transmission are therefore balanced out. The same balancing and compensating effect is achieved in the disposition of the springs 49 and 50 since they are balanced against each other and act along substantially the same line and parallel to the connecting rods. By thus balancing the springs and the connecting rods they do not have to be designed with such a high degree of accuracy as would unduly increase the cost of manufacture. If the springs were not thus arranged they would have to be calculated for actual value, whereas since the pull on the springs and connecting rods are along parallel paths, the pull of the springs need only be of equal value which can be achieved by adjusting them through the wing nuts 55 and 56.

I claim:

1. A scale comprising a pivoted beam, a pointer, and balanced connecting elements extending between the pointer and the beam, said connecting elements disposed below the beam.

2. A scale comprising a pivoted beam, a pointer, balanced connecting elements extending between the pointer and the beam, balanced opposed resisting elements connected to said beam, and acting along lines parallel to the lines of action of said connecting elements.

3. A scale comprising a pivoted beam, a pointer, balanced connecting elements extending between the pointer and the beam, balanced opposed resisting elements connected to said beam and acting along lines parallel to the lines of action of said connecting elements, said connecting elements and resisting elements being disposed below the beam.

4. A scale comprising a pivoted beam, a pointer, connecting elements extending to the pointer from points on opposite sides of the pivot point of the beam, and along coincident lines said connecting elements being disposed below the beam.

5. A scale comprising a pivoted beam, a pointer, balanced connecting elements extending to the pointer from points on opposite sides of the pivot point of the beam, and along lines parallel to each other, said connecting elements being disposed below the beam.

6. A scale comprising a pivoted beam, a pointer, connecting elements extending from the pointer to points on opposite sides of the pivot point of the beam and along parallel lines, and resisting elements connected to the beam on opposite sides of its pivot point, said resisting elements acting along lines parallel to the lines of action of the connecting elements.

7. A scale comprising a pivoted beam, a pointer, connecting elements extending from the pointer to points on opposite sides of the pivot point of the beam and along parallel lines, and resisting elements connected to the beam on opposite sides of its pivot point, said resisting elements acting along lines parallel to the lines of action of the connecting elements, said connecting elements and resisting elements being disposed below the beam.

8. A scale comprising a pivoted beam, a pointer, connections between the pointer and beam, and means disposed below the level of the beam for resisting the movement of the beam in either direction from a normal position, said means acting along a line substantially parallel with the beam.

9. A scale comprising a pivoted beam, a pointer, connections extending from the pointer to points on the beam on opposite sides of its pivot and spring means disposed below the level of the beam for resisting the movement of the beam in either direction from a normal position, said means acting along a line substantially parallel with the beam.

10. A scale comprising a pivoted beam, a pointer pivoted below the level of the beam, balanced connections extending from the pointer to points on the beam on opposite sides of its pivot, said connections being below the level of and substantially parallel to the beam.

11. A scale comprising a pivoted beam, a pointer pivoted below the level of the beam, connections extending from the pointer to points on the beam on opposite sides of its pivot, said connections being below the level of the beam, and means for resisting the movement of the beam in either direction from a normal position, said means and said connections acting along a line substantially parallel to each other and to the beam.

12. A scale comprising a pivoted beam, a pointer pivoted below the level of the beam, connections extending from the pointer to points on the beam on opposite sides of its pivot, said connections being below the level of the beam, and oppositely disposed spring means connected to points on the beam on opposite sides of its pivot to resist the movement of the beam in either direction from the normal position, said spring means and said connections acting along a line substantially parallel to each other and to the beam.

13. A scale comprising a pivoted beam, and means below the level of the beam for resisting its movement in either direction from a normal position, said means acting along a line substantially parallel with the beam.

14. A scale comprising a pivoted beam and opposed spring means connected to points on the beam on opposite sides of the pivot to resist the movement of the beam in either direction from a normal position, said means acting along a line substantially parallel with the beam.

15. A scale comprising a pivoted beam and opposed spring means connected to points on the beam on opposite sides of the pivot to resist the movement of the beam in either direction from a normal position, said means acting along a line substantially parallel with the beam, and disposed below the beam.

Signed at New York in the county of New York and State of New York this 12th day of January, A. D. 1927.

HUGH M. CAMERON.